United States Patent [19]
Jovanovic et al.

[11] Patent Number: 5,991,172
[45] Date of Patent: Nov. 23, 1999

[54] AC/DC FLYBACK CONVERTER WITH IMPROVED POWER FACTOR AND REDUCED SWITCHING LOSS

[75] Inventors: Milan M. Jovanovic; Laszlo Huber, both of Blacksburg, Va.

[73] Assignee: Delta Electronics, Inc., Taipei, Taiwan

[21] Appl. No.: 09/033,005

[22] Filed: Mar. 2, 1998

Related U.S. Application Data

[63] Continuation-in-part of application No. 08/725,904, Oct. 4, 1996, which is a continuation-in-part of application No. 08/669,001, Jun. 21, 1996.

[51] Int. Cl.⁶ .................................................. H02M 3/335
[52] U.S. Cl. ............................... 363/21; 363/97; 363/132
[58] Field of Search ................................. 363/20, 21, 37, 363/81, 89, 97, 125, 132

[56] References Cited

U.S. PATENT DOCUMENTS

| | | | |
|---|---|---|---|
| 5,301,095 | 4/1994 | Teramoto et al. | 363/21 |
| 5,424,933 | 6/1995 | Illingworth | 363/21 |
| 5,515,257 | 5/1996 | Ishii | 363/21 |
| 5,523,936 | 6/1996 | Leu et al. | 363/21 |
| 5,581,451 | 12/1996 | Ochiai | 363/21 |
| 5,652,700 | 7/1997 | Tsai et al. | 363/21 |
| 5,757,626 | 5/1998 | Jovanovic et al. | 363/21 |

OTHER PUBLICATIONS

Jinrong Qian and Fred C. Lee, A High Efficient Single Stage Single Switch High Power Factor AC/DC Converter With Universal Input, Feb. 1997, pp. 281–287

*Primary Examiner*—Adolf Deneke Berhane
*Attorney, Agent, or Firm*—Lane, Aitken & McCann

[57] ABSTRACT

A new single stage, single switch input current shaping circuit features substantially reduced turn-on switching losses of the switch in the flyback-converter. In this technique, the turn-on switching losses due to the discharge of the output capacitance of the switch are reduced by turning on the switch when its voltage is minimal or close to the minimal. To achieve the turn-on loss reduction for a wide range of line and load conditions, the flyback-converter stage is continuously operated at the boundary of the CCM and DCM by employing a variable-frequency control. In this technique the boost inductor can work either in the DCM or the CCM. The wide-bandwidth, variable-frequency control is implemented by detecting the onset of the DCM/CCM boundary and, subsequently, turning the switch on at the minimum switch voltage. The switch is turned off when the increasing primary current reaches a reference level set by the output-voltage feedback control circuit.

10 Claims, 13 Drawing Sheets

(d) $T_3 - T_4$ (e) $T_4 - T_5$

AC/DC FLYBACK CONVERTER WITH IMPROVED POWER FACTOR AND REDUCED SWITCHING LOSS

CROSS REFERENCE TO RELATED APPLICATION

This invention is a continuation-in-part of patent application "Single-Stage, Single-Switch Isolated Power-Supply Technique with Input-Current Shaping and Fast Output-Voltage Regulation," Ser. No. 08/725,904 filed Oct. 4, 1996, which is a continuation-in-part of application Ser. No. 08/669,001 filed on Jun. 21, 1996.

BACKGROUND OF THE INVENTION

1. Field of the Invention

This invention relates to an improved single-stage, single-switch, input-current-shaping technique with fast output-voltage regulation and reduced switching losses and, more particularly, to the single-stage, flyback input current-shaping circuit, which operates at the boundary of the discontinuous and continuous magnetizing current of the transformer in the entire line and load ranges.

2. Description of the Prior Art

The harmonic content of the line current drawn from the ac mains by a piece of electronic equipment is regulated by a number of standards. To comply with these standards, input-current correction (PFC) (also referred to in the art as power factor correction) of off-line power supplies is necessary. So far, a variety of passive and active ICS techniques have been proposed. While the passive techniques can be the best choice in many cost-sensitive applications, the active ICS techniques are used in the majority of applications due to their superior performance.

The most commonly used active approach that meets high power-quality requirements is the "two-stage" approach. In this approach, a non-isolated boost-like converter, which is controlled so that the rectified line current follows the rectified line voltage, is used as the input stage that creates an intermediate dc bus with a relatively large second-harmonic ripple. This ICS stage is then followed by a dc/dc converter which provides isolation and high-bandwidth voltage regulation. For high-power levels, the ICS stage is operated in the continuous-conduction mode (CCM), while the discontinuous-conduction-mode (DCM) operation is commonly used at lower power levels due to a simpler control.

In an effort to reduce the component count and also improve the performance, a number of "single-stage" ICS techniques have been introduced recently. In a single-stage approach, input-current shaping, isolation, and high-bandwidth control are performed in a single step, i.e., without creating an intermediate dc bus. Generally, these converters use an internal energy-storage capacitor to handle the differences between the varying instantaneous input power and a constant output power.

Among the single-stage circuits, a number of circuits described in M. M. Jovanovic and L. Huber, "Single-Stage, Single-Switch Isolated Power-Supply Technique with Input-Current Shaping and Fast Output-Voltage Regulation," patent application Ser. No. 08/669,001 filed on Jun. 21, 1996; F. S. Tsai, et al., "Low Cost AC-to-DC Converter Having Input Current with Reduced Harmonics," U.S. Pat. No. 5,652,700; and J. Qian and F. C. Lee, "A High Efficient Single Stage Single Switch High Power Factor AC/DC Converter with Universal Input," *IEEE Applied Power Electronics Conference (APEC) Proc.*, pp. 281–287, February 1997, seem particularly attractive because they can be implemented with only one semiconductor switch and a simple control. All these single-stage, single-switch input-current shapers ($S^4$ICS) integrate the boost-converter front end with the forward-converter or the flyback-converter dc/dc stage. FIG. 1 shows the $S^4$ICS flyback converter implementation introduced in the Ser. No. 08/669,001 application. Transformer windings $N_1$ and $N_2$ are used to reduce the voltage of the energy-storage capacitor $C_B$. In addition, winding $N_2$ is utilized for the direct energy transfer from the input to the output. A small input capacitor $C_{in}$ is used to filter out the switching-frequency ripple of the ICS-inductor current. Consequently, the rectified line current is the average of the current flowing from ICS inductor $L_B$.

One side of boost inductor $L_B$ is coupled to full-wave rectified input $v_{in(rec)}$ derived from the ac mains. Winding $N_2$ of isolation transformer $T_1$ is coupled, via diode $D_2$, between the other side of boost inductor $L_B$ and one side of primary winding $N_P$ of isolation transformer $T_1$. Winding $N_1$ of isolation transformer $T_1$ is coupled, via diode $D_1$, between the other side of boost inductor $L_B$ and the other side of primary winding $N_P$.

As explained in the Ser. No. 08/669,001 application, in the circuit in FIG. 1, two additional primary windings $N_1$ and $N_2$ are employed to keep the voltage of energy-storage (bulk) capacitor $C_B$ below the desired level of 450 V in the entire line and load ranges. Winding $N_1$ appears in series with boost inductor $L_B$ during the on-time of switch SW, whereas winding $N_2$ appears in series with $L_B$ during the off-time of the switch. By connecting the windings so that the voltages across them when they conduct the boost-inductor current are in the opposition to the line voltage, the volt-second balance of the boost-inductor core is achieved at a substantially lower voltage of the energy-storage capacitor compared to the corresponding circuit without the windings. In addition, in the circuit in FIG. 1, winding $N_2$ provides a path for a direct transfer of a part of the input energy to the output during the off-time of the switch. For a properly selected number of turns of winding $N_2$, this direct energy transfer increases the conversion efficiency of the circuit.

As explained in the Ser. No. 08/669,001 application, the $S^4$ICS flyback converter in FIG. 1 can operate either with a discontinuous or a continuous current of boost inductor $L_B$. Generally, the continuous-conduction mode (CCM) of operation offers a slightly higher efficiency compared to the discontinuous-conduction mode (DCM). However, the DCM operation gives a lower total harmonic distortion (THD) of the line current compared to that of the CCM operation.

The output-voltage regulation of the $S^4$ICS flyback converter in FIG. 1, is implemented by a constant-frequency two-loop control. The two loops, current loop $T_i$ and voltage loop $T_v$, are indicated in FIG. 1. In the voltage loop, output voltage $V_o$ is scaled down with resistive divider $R_1$–$R_2$ before it is compared to reference voltage $V_{REF}$ at the input of error amplifier EA. The output of error amplifier EA, whose voltage $V_{EA}$ is proportional to the error between output voltage $V_o$ and reference voltage $V_{REF}$, is connected to the inverting input of the comparator. In the current loop, the current of switch SW is sensed during the switch on-time, and converted to a suitable voltage signal by sensing device (resistor) $R_i$ before it is connected to the non-inverting input of the comparator. In the control circuit in FIG. 1, a constant-frequency clock signal initiates the turn-on of switch SW by setting the RS latch output Q high. Since during the time period that switch SW is closed, switch current $i_{SW}$ increases, the sensed voltage $R_i i_{SW}$ at the non-inverting input of the comparator also increases. When voltage $R_i i_{SW}$ reaches the $V_{EA}$ voltage level, the output of the comparator transitions from the low to the high state resetting the RS latch and turning off switch SW. In this regulation scheme, output voltage of the error amplifier $V_{EA}$ automatically adjusts to the level which is necessary to produce a duty cycle of switch SW that is required to maintain output voltage $V_o$ constant.

Generally, in ICS application, the rectified line voltage, which is the input voltage to the converter, contains a large ripple. This input-voltage ripple propagates through the power stage causing an increased output-voltage ripple at the rectified-line frequency. To eliminate the rectified-line-voltage component of the output-voltage ripple, it is necessary to design the output-voltage feedback loop ($T_v$) with a bandwidth which is wide enough to attenuate the ripple to the desired value. The desired bandwidth, regulation accuracy, and control-loop stability are set by a proper selection of compensation impedances $Z_1$ and $Z_2$, shown in FIG. 1. It should be noted that current loop $T_i$ in FIG. 1 also plays a major roll in the attenuation of the output-voltage ripple.

FIG. 2 shows the key waveforms of the $S^4$ICS flyback converter in FIG. 1 operating with a discontinuous boost inductor current $i_{LB}$ and with a continuous magnetizing current $i_M$ of the flyback transformer. To facilitate the explanation of operation, the transformer in FIG. 1 is shown as the parallel combination of transformer's magnetizing inductance $L_M$ and the ideal transformer consisting of primary winding $N_P$ and secondary winding $N_S$. Since $L_B$ works in the DCM, $i_{LB}$ is zero prior to the turn-on of switch SW at $t=T_0$. As can be seen from FIG. 2, after clock initiates the turn-on of switch SW at $t=T_0$, boost inductor current $i_{LB}$ starts increasing linearly with a slope of $(V_{in(rec)}-(N_1/N_P)V_B)/L_B$. At the same time, due to a positive voltage across the primary winding of the transformer, secondary current $i_S$ cannot flow because rectifier $D_F$ is reverse biased. Since the primary voltage during the on-time is constant and equal to the storage-capacitor voltage $V_B$, magnetizing current $i_M$ increases with a constant slope of $V_B/L_M$, where $L_M$ is the primary-side-referred magnetizing inductance of the transformer. Also, because of the magnetic coupling between windings $N_1$ and $N_P$, current $i_{LB}$, which flows through winding $N_1$ during the on-time of switch SW, induces current $i_{P1}=-(N_1/N_P)i_{LB}$ in the primary winding of the transformer. Due to the existence of negative current $i_{P1}$, the component of magnetizing current $i_M$ supplied from energy-storage capacitor $C_B$, $i_{CB}$, is reduced. Since during the on-time switch current is $i_{SW}$ is the sum of boost-inductor current $i_{LB}$ and primary current $i_P=i_M+i_{P1}=i_{CB}$, $i_{SW}$ also increases linearly, as shown in FIG. 2. The conduction of switch SW is terminated at $t=T_1$ when sensed voltage $R_i i_{SW}$ at the non-inverting input of the comparator reaches the level of error-amplifier output voltage $V_{EA}$ at the inverting input of the comparator. After switch SW is turned off, boost inductor current $i_{LB}$ is diverted from winding $N_1$ to winding $N_2$ forcing the conduction of diode $D_2$. At the same time, due to a positive voltage on the secondary winding, diode $D_F$ starts conducting secondary current $i_S$, while primary current $i_P$ ceases flowing. It should be also noted that because of the magnetic coupling between windings $N_2$ and $N_S$, during the off-time a part of the input energy is directly transferred to the output instead of first being stored in energy-storage capacitor $C_B$. This direct energy transfer occurs as long as decreasing boost inductor current $i_{LB}$ is flowing through winding $N_2$. When $i_{LB}$ becomes zero at $t=T_2$, diode $D_2$ stops conducting, and the entire secondary current $i_S$ consists of the decreasing magnetizing current.

From $v_{SW}$ waveform in FIG. 2, it can be seen that during the off time, the voltage across switch SW is given by $V_{SW(off)}=V_B+nV_o$, where $n=N_P/N_S$ is the turns ratio of the transformer. As a result, the energy stored in the parasitic output capacitance of the switch, $C_{oss}$, prior to its turn on is equal to $$E_C = \frac{1}{2}C_{oss}V_{SW(off)}^2. \tag{1}$$

This energy is dissipated in the switch when the switch is turned on. If the circuit in FIG. 1 operates at constant switching frequency $f_S$, the power dissipation of the switch associated with the capacitive-discharge turn-on loss is $$P_{ON(cap)} = E_C f_S = \frac{1}{2}C_{oss}V_{SW(off)}^2 f_S. \tag{2}$$

As can be seen from Eq. (2), capacitive-discharge turn-on switching loss $P_{ON(cap)}$ increases linearly with the switching frequency, $f_S$, and quadratically with the voltage across the switch immediately before the switch turns on, $V_{SW(off)}$. Since $V_{SW(off)}=V_B+nV_o$ increases as the line voltage increases because $V_B$ increases with the line voltage, the capacitive-discharge turn-on switching loss is maximum at high line. Generally, MOSFET switches with lower on-resistances $R_{DS(on)}$, which reduce conduction losses, possess larger output capacitances $C_{oss}$. Therefore, at high switching frequencies, the capacitive-discharge turn-on switching loss has a detrimental effect on the efficiency of the circuit in FIG. 1, especially, at high line. Because $P_{ON(cap)}$ does not depend on the load current but only on the line voltage, $P_{ON(cap)}$ dominates the switch loss at light loads and, consequently, limits the light-load efficiency. A reduced light-load efficiency makes very difficult to comply with Environmental Protection Agency's Energy Star requirement which sets a voluntary power-consumption limit of an idling personal computer to 60 W (30 W for the monitor and 30 W for the computer box).

Similar conclusions with respect to the capacitive-discharge turn-on loss can be drawn for the $S^4$ICS flyback converter in FIG. 1 operating with a discontinuous boost inductor current $i_{LB}$ and with a discontinuous magnetizing current $i_M$ of the flyback transformer. As shown in FIG. 3, the voltage of switch SW during the off-time of the switch in the $S^4$ICS flyback converter operating with a discontinuous magnetizing current of the transformer is equal to $V_{SW(off)}=V_B$, if the switch capacitance is negligible. Otherwise, $V_{SW(off)}$ is oscillating around $V_B$ with the amplitude equal to $nV_o$ because of the resonance between the magnetizing inductance of the transformer, $L_M$, and the output capacitance of the switch, $C_{oss}$. Therefore, the $S^4$ICS flyback converter operating with a discontinuous magnetizing current of the transformer also suffers from capacitive-discharge turn-on switching loss $P_{ON(cap)}$. Generally, this loss is dependent on the turn-on switching instant due to the resonant nature of the switch voltage during the off-time. However, the worst-case $P_{ON(cap)}$ in the $S^4$ICS flyback converter operating with a discontinuous magnetizing current of the transformer (waveforms shown in FIG. 3) is the same to that of the converter operating with a continuous magnetizing current of the transformer (waveforms shown in FIG. 2). Finally, it should be noted that the mode of operation of boost inductor $L_B$ (DCM or CCM) does not have any effect on the $P_{ON(cap)}$.

SUMMARY OF THE INVENTION

In this invention, a new S⁴ICS technique which features substantially reduced turn-on switching losses of the switch in the flyback-converter S⁴ICS is described. In this technique, the turn-on switching losses due to the discharge of the output capacitance of the switch are reduced by turning on the switch when its voltage is minimal or close to the minimal. To achieve the turn-on loss reduction for a wide range of line and load conditions, the flyback-converter stage is continuously operated at the boundary of the CCM and DCM by employing a variable-frequency control. In this technique the boost inductor can work either in the DCM or the CCM.

The wide-bandwidth, variable-frequency control is implemented by detecting the onset of the DCM/CCM boundary and, subsequently, turning the switch on at the minimum switch voltage. The switch is turned off when the increasing primary current reaches a reference level set by the output-voltage feedback control circuit.

DETAILED DESCRIPTIONS OF THE PREFERRED EMBODIMENTS

Figure 1:
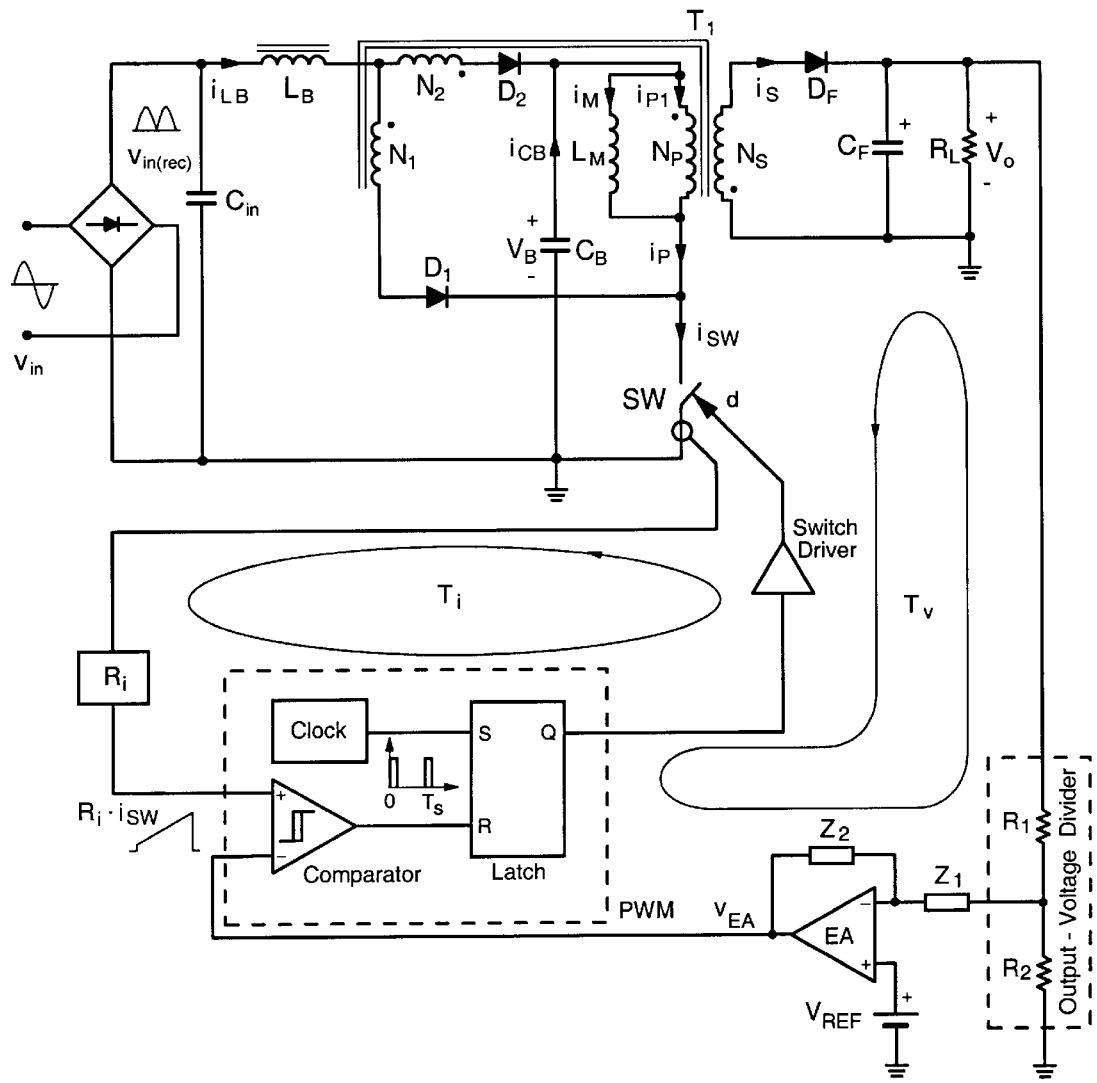
FIG. 1 shows the circuit diagram of the power stage and control of the constant-frequency S⁴ICS flyback converter introduced in application Ser. No. 08/669,001.
Figure 2:
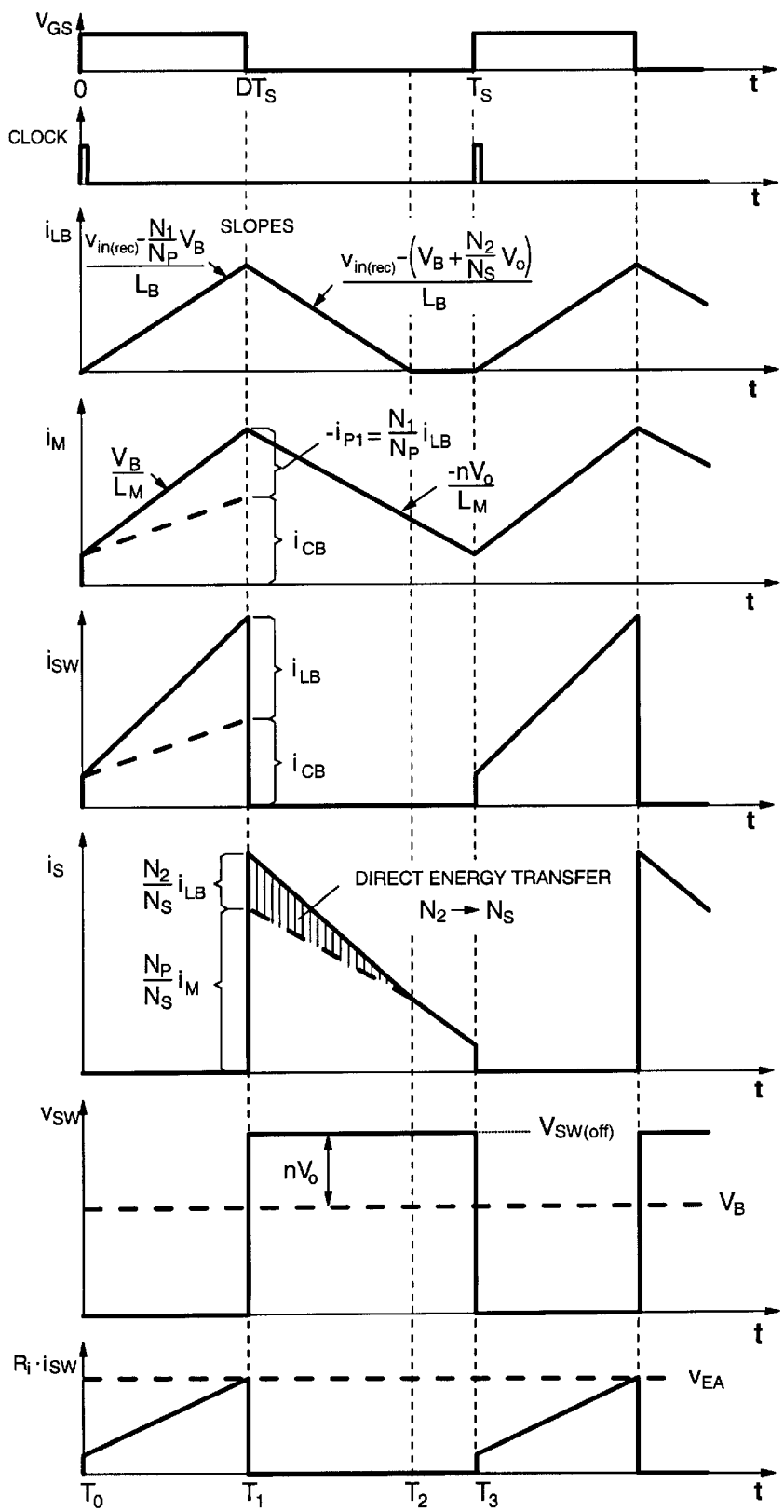
FIG. 2 shows the key waveforms of the constant-frequency S⁴ICS flyback converter in FIG. 1 operating with a discontinuous current of boost inductor $L_B$ and continuous magnetizing current of the flyback transformer.
Figure 3:
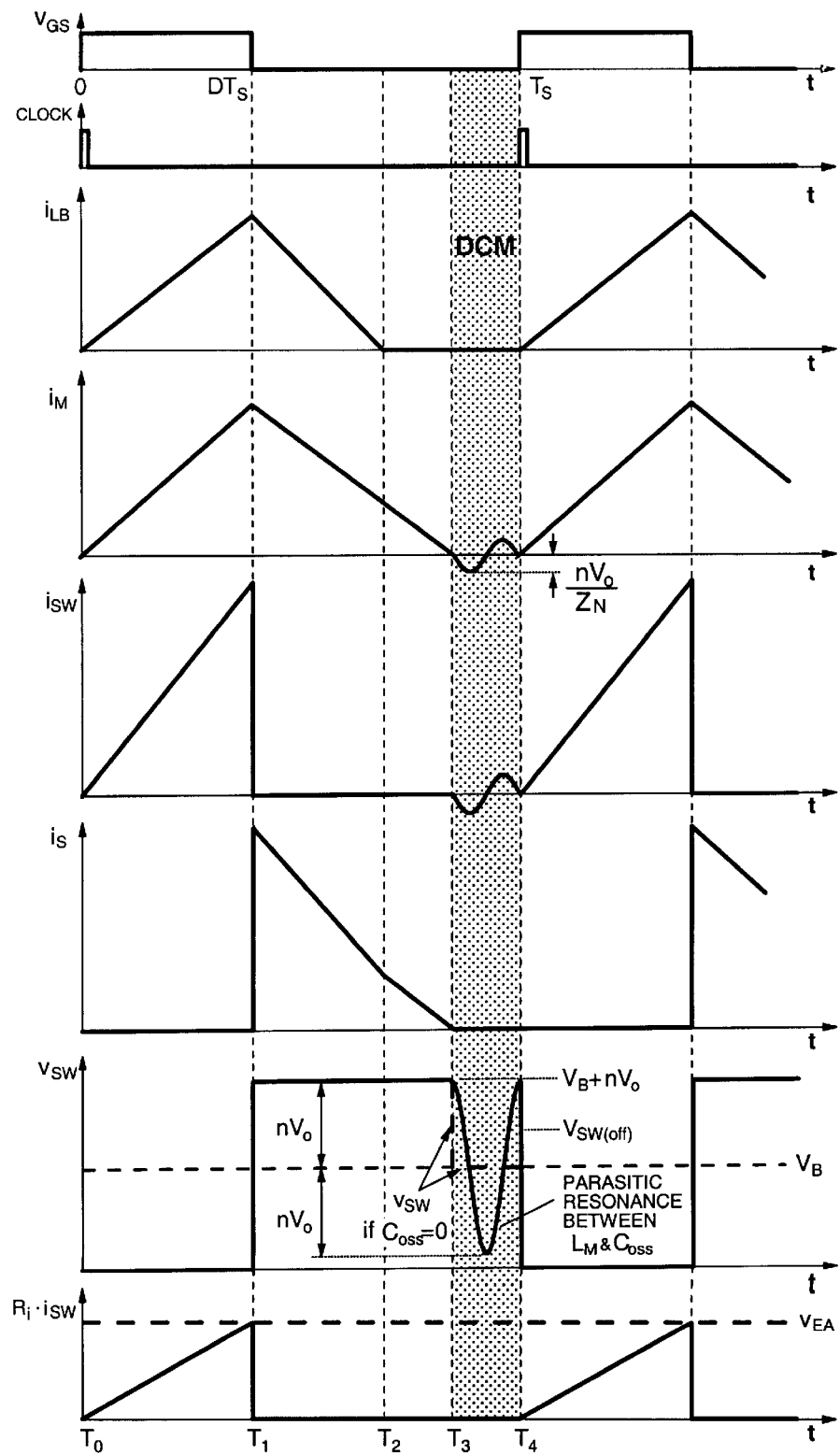
FIG. 3 shows the key waveforms of the constant-frequency S⁴ICS flyback converter in FIG. 1 operating with a discontinuous current of boost inductor $L_B$ and discontinuous magnetizing current of the flyback transformer.
Figure 4:
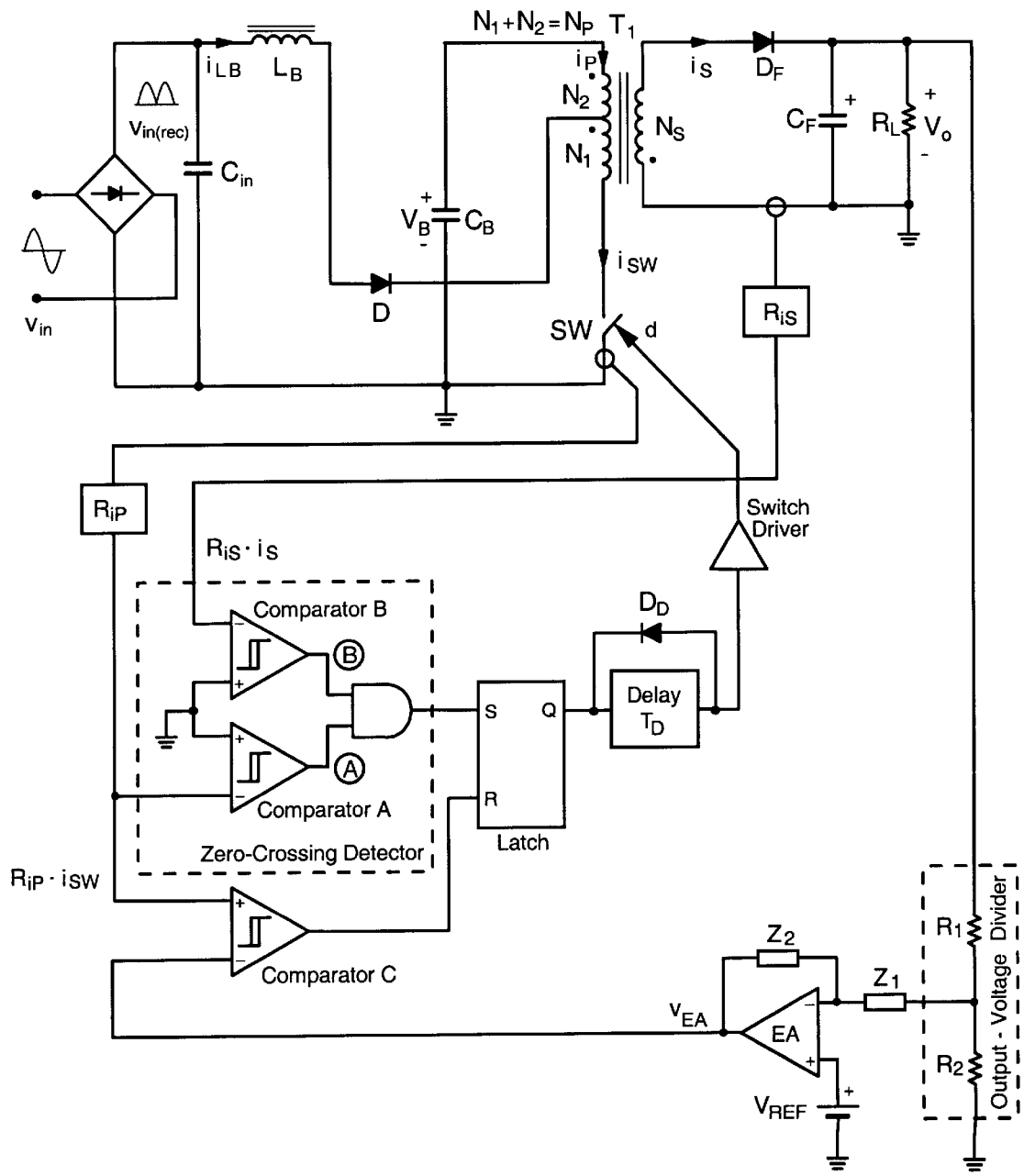
FIG. 4 shows the circuit diagram of the power stage and control of the S⁴ICS flyback converter with reduced switching losses proposed in this invention.

FIG. 4 shows the circuit diagram of the power stage and control of the proposed S⁴ICS which combines the boost-converter input stage with the flyback-converter output stage. The power stage employs a transformer with center-tapped primary winding $N_P = N_1 + N_2$. As in the circuit in FIG. 1, windings $N_1$ and $N_2$ are used to reduce the voltage of the energy-storage capacitor, $V_B$. In addition, $N_2$ serves for the direct energy transfer from the input to the output, which increases the conversion efficiency. The control of the circuit in FIG. 4 is implemented by sensing the onset of the DCM/CCM boundary by sensing the zero crossing of the secondary current. It should be noted that the DCM/CCM boundary sensing can be also implemented by sensing the primary or the secondary voltage, as it will be discussed later.

Figure 5:
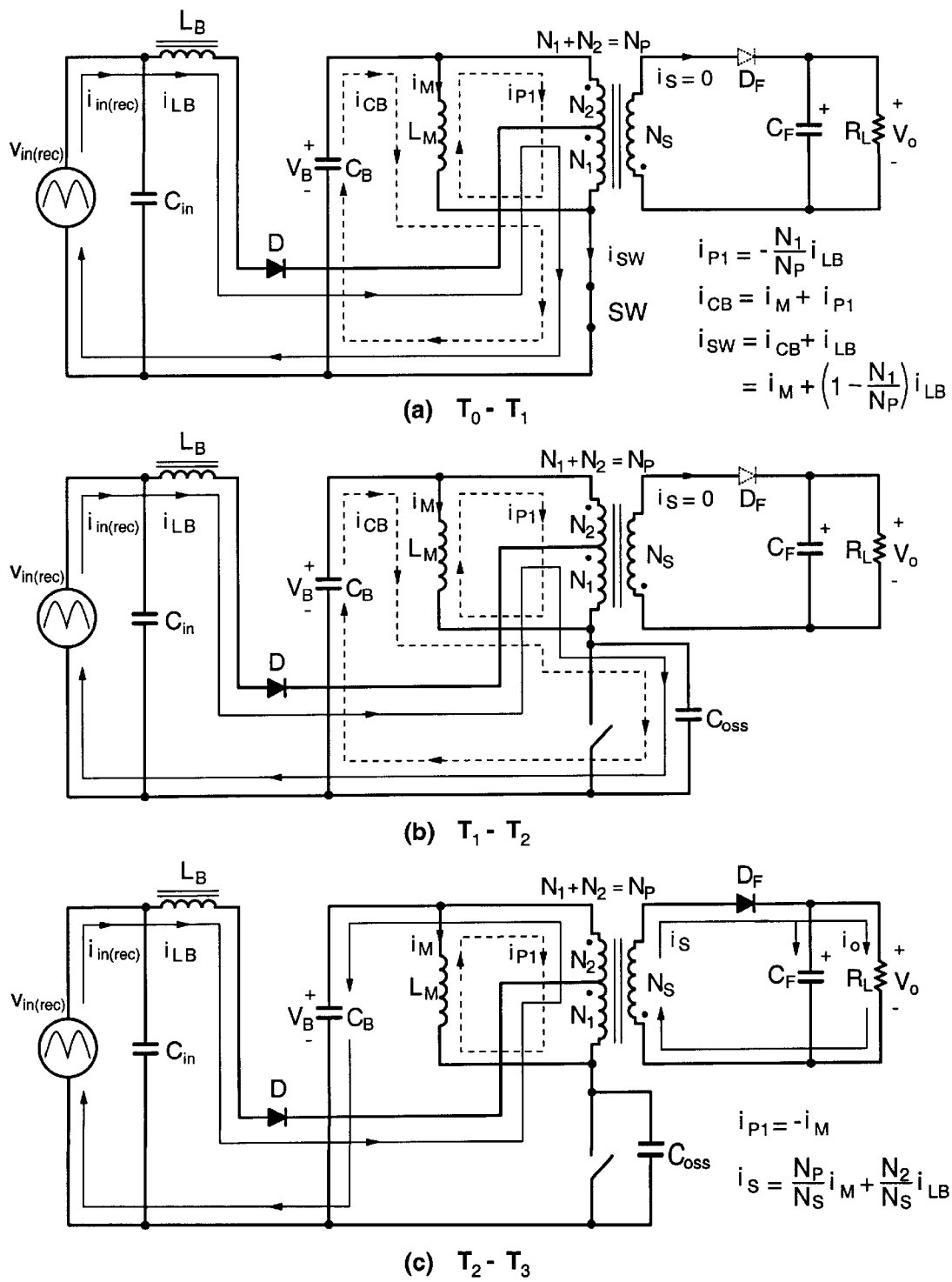
FIGS. 5a–e shows the topological stages of the S⁴ICS flyback converter in FIG. 4.
Figure 5:
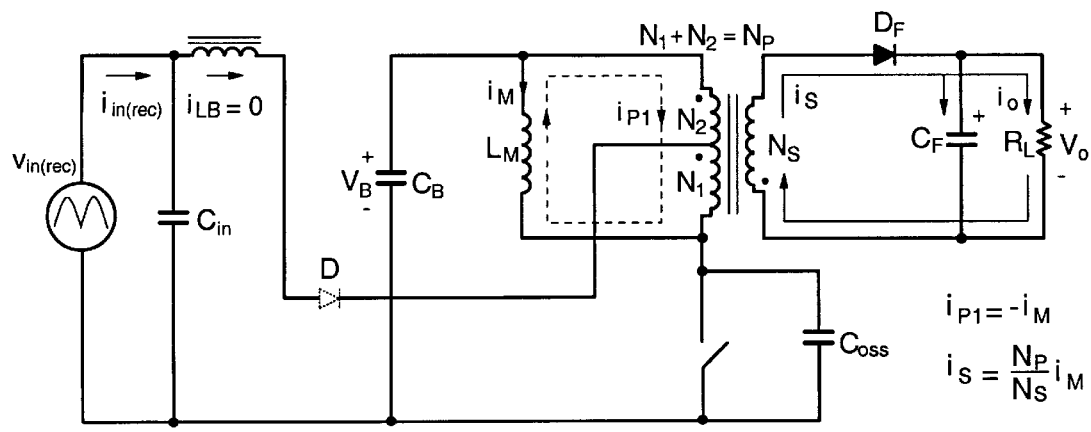
Figure 5:
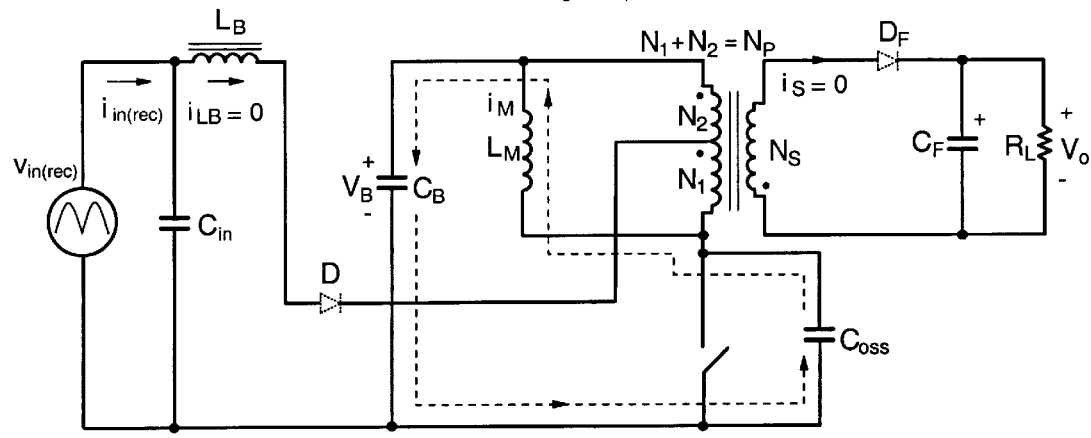
Figure 6:
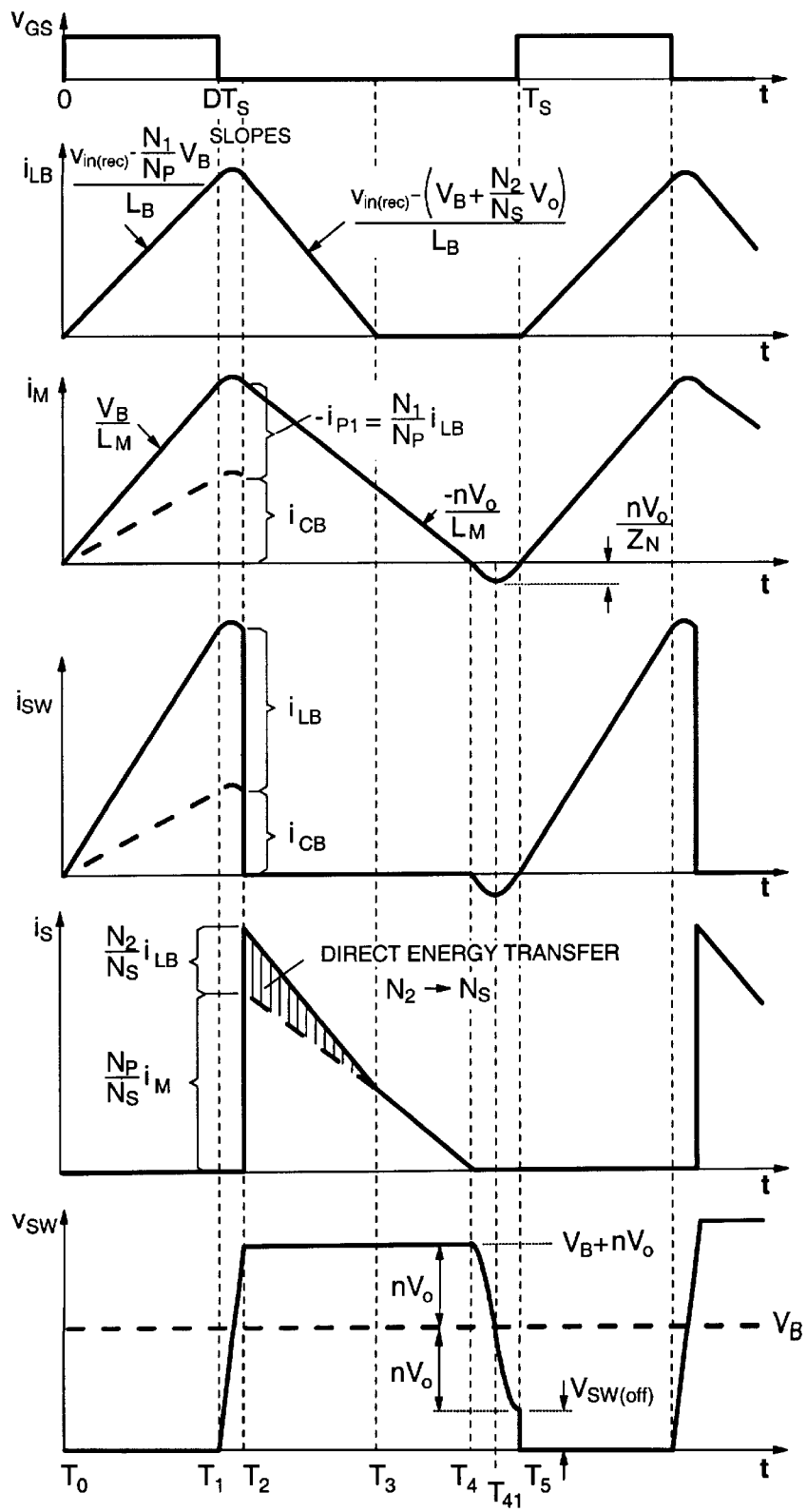
FIG. 6 shows the key waveforms of the S⁴ICS flyback converter in FIG. 4.
Figure 6:
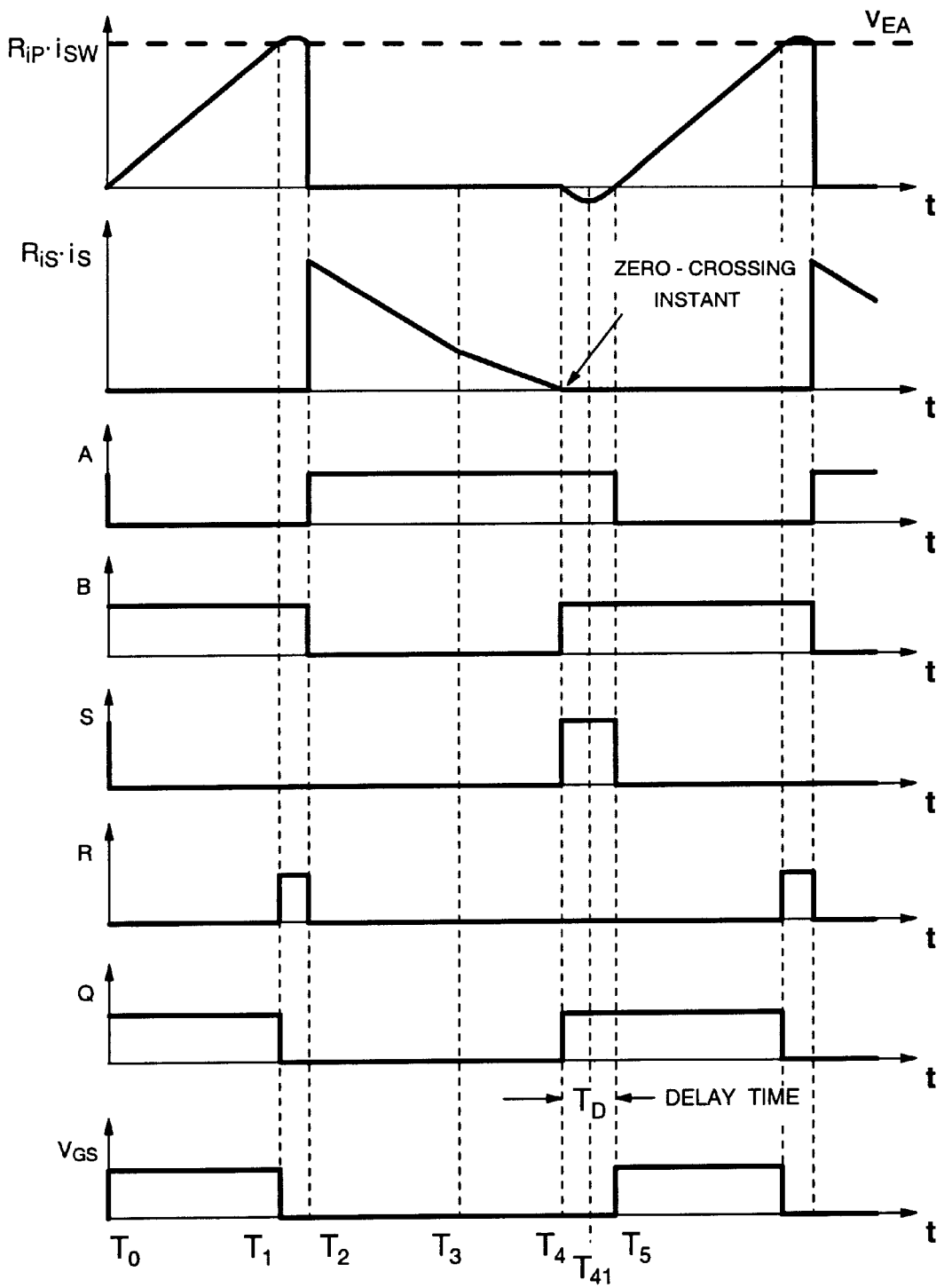

To facilitate the analysis of operation, FIGS. 5 and 6 show respectively the topological stages and key waveforms during a switching cycle of the converter in FIG. 4 operating with boost-inductor current $i_{LB}$ in the DCM. To simplify the analysis, it is assumed that all semiconductor components are ideal, except for the output capacitance of the primary switch, $C_{oss}$. According to this assumption, the primary switch and the rectifiers represent ideal short and open circuits in their on and off states, respectively. In addition, the flyback transformer is modeled by an ideal transformer with magnetizing inductance $L_M$ in parallel with primary winding $N_P$, as shown in FIG. 5. Finally, in the following analysis, the input voltage of the converter is considered constant during a switching cycle because the switching frequency is much higher than the line frequency.

Since boost inductor $L_B$ in FIG. 4 operates in the DCM and the magnetizing inductance of the flyback transformer operates at the DCM/CCM boundary, at the moment immediately before switch SW is turned on, $i_{LB}$, $i_M$, and $i_s$ are zero. After switch SW is closed at $t = T_0$, $i_M$ starts flowing through the switch, as shown in FIG. 5(a). Since energy-storage capacitor voltage $V_B$ is constant during a switching cycle, magnetizing current $i_M$ increases linearly with a slope of $$\frac{d i_M}{d t} = \frac{V_B}{L_M}, \tag{3}$$

as shown in FIG. 6.

If rectified line voltage $v_{in(rec)}$ is lower than $(N_1/N_P)V_B$, no boost-inductor current $i_{LB}$ can flow because diode D is reverse biased. Otherwise, $i_{LB}$ flows through diode D, winding $N_1$, and switch SW as indicated in FIG. 5(a). The slope of $i_{LB}$ is given by $$\frac{d i_{LB}}{d t} = \frac{v_{in(rec)} - (N_1/N_P)V_B}{L_B}, \tag{4}$$

where $V_{in(rec)}$ is the instantaneous rectified line voltage for the switching cycle commencing at $t=T_0$, $N_1$ is the number of turns of winding $N_1$, and $N_P = N_1 + N_2$ is the number of turns of the primary winding.

Because of the magnetic coupling between windings $N_1$ and $N_2$, the current flowing through $N_1$ and $N_2$, $i_{P1}$, is $$i_{P1} = -\frac{N_1}{N_P} i_{LB}. \tag{5}$$

Also, as can be seen from FIG. 5(a), energy-storage-capacitor current $i_{CB}$ is $$i_{CB} = i_M + i_{P1} = i_M - \frac{N_1}{N_P} i_{LB}, \tag{6}$$

whereas switch current $i_{SW}$ is $$i_{SW} = i_{CB} + i_{LB} = i_M + \left(1 - \frac{N_1}{N_P}\right) i_{LB}. \tag{7}$$

Since during the time switch SW is turned-on the secondary voltage keeps secondary rectifier $D_F$ reverse biased, as shown in FIG. 5(a), secondary current $i_S$ during the on-time of switch SW is zero.

During the on-time of switch SW, the output of comparator A in the zero-crossing detector circuit in FIG. 4 is low, whereas the output of comparator B is high. As a result, the output of the AND gate is low, holding the S (set) input of the SR latch low during the entire on-time. The on-time of the switch is terminated at $t=T_1$ when sensed voltage $R_{iP}i_{SW}$ at the input of comparator C, which is proportional to the linearly increasing switch current, reaches the level of control voltage $V_{EA}$. At that moment the R (reset) input of the latch transitions from the low level to the high level, forcing the latch output Q to change from high to low. Because of diode $D_D$ connected in parallel to the delay circuit in FIG. 4, the high-to-low transition of Q is immediately transferred to the input of the switch driver, i.e., switch SW is turned off without a delay.

After switch SW is turned off, currents $i_{LB}$ and $i_{CB}$ continue to flow through output capacitance of the switch $C_{oss}$ instead through switch SW, as shown in FIG. 5(b). As a result, switch voltage $v_{SW}$ starts increasing, as shown in FIG. 6. When switch voltage $v_{SW}$ exceeds $V_B$ for $nV_o$, i.e., when $v_{SW}$ reaches $V_B+nV_o$, at $t=T_2$, secondary-side rectifier $D_F$ becomes forward biased, as shown in FIG. 5(c). Because of the conduction of rectifier $D_F$, switch voltage $v_{SW}$ stays clamped to $V_B+nV_o$. At the same time, reflected magnetizing current $(N_P/N_S)i_M=-(N_P/N_S)i_{P1}$ starts flowing through the secondary. In addition, at $t=T_2$, boost-inductor current $i_{LB}$ begins flowing through diode D, winding $N_2$, and energy-storage capacitor $C_B$, as shown in FIG. (5)(c). Because of the magnetic coupling between winding $N_2$ and secondary winding $N_S$, $i_{LB}$ is also reflected to the secondary. According to FIG. 5(c), the secondary current is given by $$i_S = \frac{N_P}{N_S}i_M + \frac{N_2}{N_S}i_{LB}, \qquad (8)$$

where $N_S$ is the number of turns of the secondary winding.

As can be seen from Eq. (8), $i_S$, which during the off-time supplies energy to the output, is composed of two components which draw energy from different sources. The energy of the component associated with the magnetizing current is obtained from the energy stored in the magnetic field during the on-time, while the energy associated with the boost-inductor current is drawn directly from the input line. The two $i_S$ components are indicated in the $i_{LB}$ waveform in FIG. 6. According to Eq. (8), the portion of the output energy directly transferred from the line can be adjusted by the $N_2/N_S$ ratio.

It should be noted that at $t=T_2$ the outputs of comparators A and B change the state. Namely, the output of comparator A changes from low to high, whereas the output of comparator B changes from high to low. These changes do not have any effect on the output of the AND gate, i.e., the S input of the latch, which continues to stay in the low-level logic state. However, at $t=T_2$, the R input of the latch changes state from high to low because the primary current stops flowing and sensed voltage $R_{iP}i_{SW}$ becomes zero. Since the SR latch is only triggered with positive edge transitions, the high-to-low transition at the R input does not change the state of the latch, i.e., output Q stays low (keeping switch SW off).

It should be also noted that at $t=T_2$, the instantaneous, simultaneous transitions of the outputs of comparators A and B in the opposite directions create a signal-racing situation. This may lead to a generation of a false pulse at the AND-gate output and, therefore, to a false triggering of the latch. This racing problem in FIG. 6 is a consequence of the assumption that at $t=T_2$ switch current $i_{sw}$ and secondary current $i_S$ commutate instantaneously. However, in a practical circuit, due to leakage inductances of the transformer, which are neglected in this analysis, the commutation of the currents takes a short but finite time. In fact, in the presence of the leakage inductances, the output of comparator B transitions from high to low at $t=T_2$, which marks the beginning of the commutation period, whereas the output of comparator A changes the state at the end of the commutation period which occurs at a later instant. Therefore, in the presence of the leakage inductances of the transformer, the signal-racing at $t=T_2$ does not exist, and no false triggering of the latch can occur.

As can be seen from FIG. 6, after $t=T_2$, $i_{LB}$ and $i_M$ decrease linearly. According to FIG. 5(c), the downslope of $i_{LB}$ is given by $$\frac{di_{LB}}{dt} = -\frac{V_B + (N_2/N_S)V_o - v_{in(rec)}}{L_B}, \qquad (9)$$

whereas, the downslope of $i_M$ is $$\frac{di_M}{dt} = -\frac{nV_o}{L_M}. \qquad (10)$$

From Eq.(9), it can be seen that winding $N_2$ reduces energy-storage-capacitor voltage $V_B$ required to reset $L_B$ for the amount of the induced voltage $(N_2/N_S)V_o$ across winding $N_2$.

When at $t=T_3$, $i_{LB}$ decreases to zero, diode D turns off, as shown in FIG. 5(d). However, linearly decreasing magnetizing current $(N_P/N_S)i_M=-(N_P/N_S)i_{P1}$ continues to flow in the secondary until it becomes zero at $t=T_4$, FIG. 6. To operate the flyback-converter output stage at the DCM/CCM boundary, primary switch SW needs to be turned on immediately after $i_S$ falls to zero at $t=T_4$. However, if switch SW is turned on at $t=T_4$, capacitive-discharge turn-on loss $P_{ON(cap)}$ would not be reduced because switch SW would be turned on with voltage $V_{SW(off)}=V_B+nV_o$ across it. In fact, since this voltage is exactly the same as the voltage in the circuit in FIG. 1, the $P_{ON(cap)}$ loss of the circuits in FIGS. 1 and 4 would be the same if the circuits were operated at the same frequency and if they used the same switches.

To achieve a reduction of $P_{ON(cap)}$, it is necessary to delay the turn-on of primary switch SW with respect to the instant secondary current $i_S$ falls to zero. This can be achieved by inserting a delay circuit between the output of the SR latch and the switch driver, as shown in FIG. 4. In fact, in the control implementation in FIG. 4, when $i_S$ becomes zero at $t=T_4$, the output of comparator B in the zero-crossing detector transitions from low to high, causing the output of AND gate (S input of the latch) to go high. The low-to-high transition at the S input of the latch causes the Q output of the latch to also change from low to high. However, because of the delay circuit, the change at the latch output appears at the input of the switch driver after a constant delay $T_D$. This delay is determined so that switch SW is turned on with the minimum voltage across it.

As shown in FIG. 5(e), when switch SW is kept off after $t=T_4$, magnetizing inductance of the transformer $L_M$ and output capacitance of the switch $C_{oss}$ form a series resonant circuit. As a result, magnetizing current $i_M$ and switch voltage $v_{SW}$ resonate. During the resonance, $v_{SW}$ decreases below $V_B+nV_o$, whereas $i_M$ increases in the negative direction, as shown in FIG. 6. As can be seen from FIG. 6, at $t=T_{41}$, $v_{SW}$ falls to $V_B$, whereas $i_M$ reaches its negative peak of $nV_o/Z_N$, where $Z_N=\sqrt{L_M/C_{oss}}$ is the characteristic impedance of the $L_M$-$C_{oss}$ resonant circuit. Due to the energy stored in $L_M$, $v_{SW}$ continues to fall below $V_B$ after $t=T_{41}$, while $i_M$ starts increasing toward zero. As can be seen from FIG. 6, switch voltage $v_{SW}$ becomes minimum at $t=T_5$, when $i_M$ reaches zero. Since the amplitude of resonance is $2nV_o$, the minimum $v_{sw}$ is given by $$V_{SW(off),min} = V_{SW(max)} - 2nV_o = (V_B + nV_o) - 2nV_o = V_B - nV_o. \quad (11)$$

To minimize the capacitive-discharge turn-on loss, switch SW needs to be turned on at $t=T_5$ when $V_{SW(off)}$ is minimal. Since the time interval from $t=T_4$, when $i_S$ reaches zero, to $t=T_5$, when $V_{SW(off)}$ becomes minimal is equal to one-half of a resonant period of the $L_M$-$C_{oss}$ resonant circuit, the required delay of the controller can be calculated from $$T_D = \pi\sqrt{L_M C_{oss}}. \quad (12)$$

However, it should be noted that $C_{oss}$ is dependent on the voltage (nonlinear capacitance) and that both $L_M$ and $C_{oss}$ are temperature dependent. Therefore, the constant delay calculated from Eq.(12) does not ensure that switch SW is turned on at the minimum voltage under all operating conditions. Nevertheless, the switch would be turned on close to the minimum voltage since the variations of the parameters in Eq. (12) are not large.

Finally, when switch SW is turned on at $t=T_5$ by the delayed transition at the S input of the SR latch, the output of comparator A transitions from high to low causing the output of the AND gate (S input of the latch) to go low.

Since the control circuit in FIG. 4 does not have a clock to initiate a switching transition, but the turn-on and turn-off switching instants are determined by comparisons of sensed primary and secondary currents with the zero reference level, the controller works with a variable switching frequency. Moreover, both the on-time and the off-time are variable. The frequency is maximum at the highest line voltage and the minimum load, whereas the minimum switching frequency occurs at the lowest line voltage and the full load.

It should be noted that according to Eq. (11), the switch in the circuit in FIG. 4 can be turned on with zero voltage, if the circuit is designed so that $$nV_o \geq V_B. \quad (13)$$

To achieve zero-voltage switching (ZVS) in the entire line range, the ZVS condition in Eq. (13) must be met at the highest line voltage, i.e., $$nV_o \geq V_{B(max)}, \quad (14)$$

where $V_{B(max)}$ is the maximum energy-storage capacitor voltage which occurs at the highest line voltage, $V_{in(max)}$.

Since the maximum voltage of switch SW, as seen from the $v_{SW}$ waveform in FIG. 6, is $$V_{SW(max)} = V_{B(max)} + nV_O, \quad (15)$$

if $nV_o$ is selected to meet the ZVS condition in Eq. (11), the maximum voltage stress on the switch is $$V_{SW(max)} \geq 2V_{B(max)}. \quad (16)$$

As a result, in universal-line applications ($V_{in}$=90 Vac–265 Vac), where a typical value of $V_{B(max)}$ is around 400 Vdc, a design which achieves ZVS in the entire line range would require a switch with a voltage rating in excess of 800 V. Since higher voltage-rated switches have higher on-resistances and are more expensive than their counterparts with lower voltage ratings, a design with ZVS in the entire line range neither gives the optimal performance nor it is cost effective. In fact, in a design with the optimum trade-off between performance and cost, $nV_o$ is selected based on the desirable maximum stress of the switch with a lower voltage (600–800 V) rating. However, for such a selection of $nV_o$, no ZVS is achieved at high line and, very often, it is not achieved even at low line. Still, the switch is turned on with a substantially reduced voltage, resulting in a significantly lower capacitive-discharge turn-on switching loss.

Figure 7:
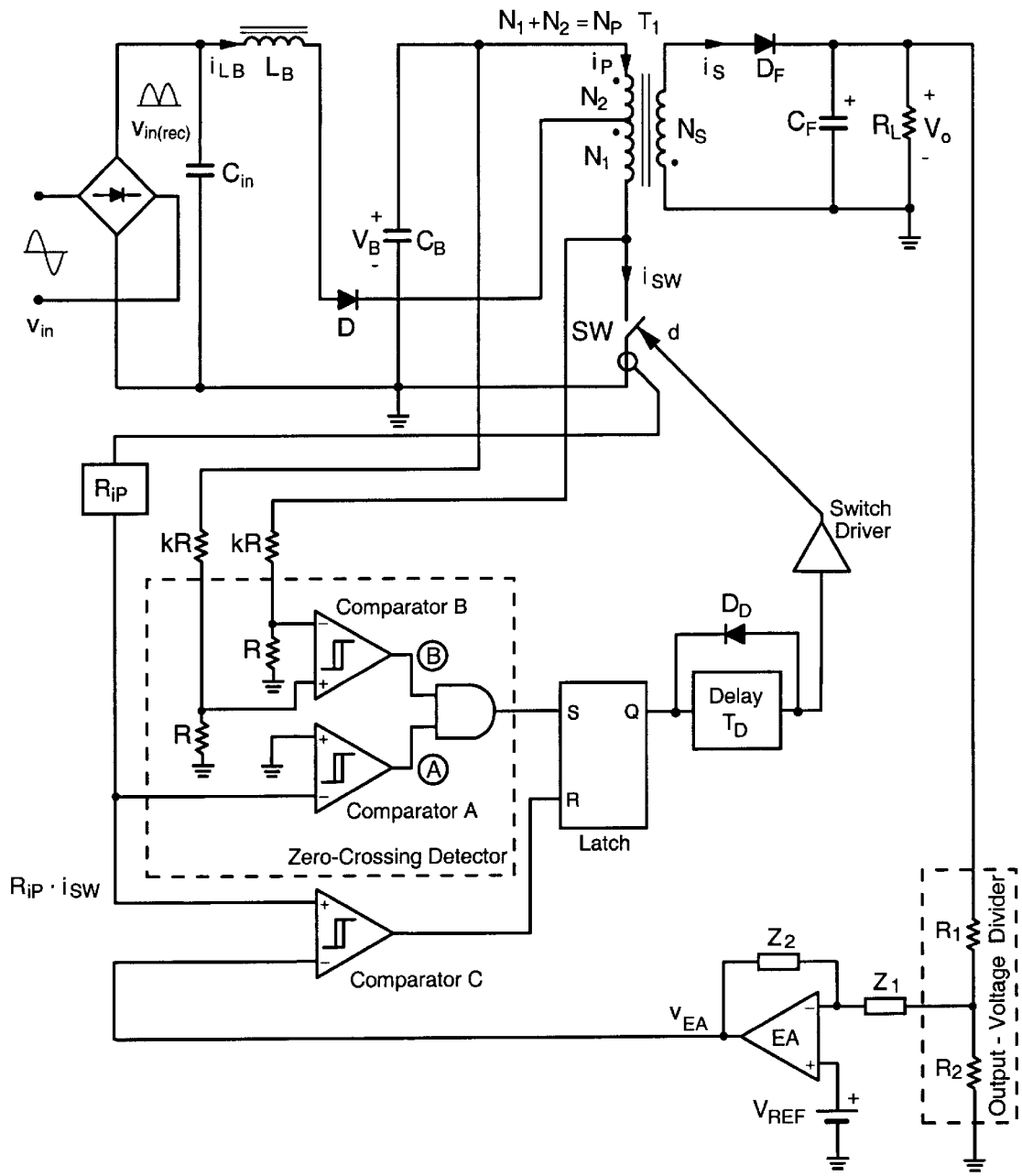
FIG. 7 shows implementation of the S⁴ICS flyback converter in FIG. 4 which detects the DCM/CCM boundary by sensing the switch voltage.

The circuit in FIG. 4 can be implemented in a number of different ways. For example, the DCM/CCM boundary can be detected by sensing the primary or the secondary voltage of the transformer instead of sensing the secondary current. As an illustration, FIG. 7 shows the implementation which senses the primary voltage to detect the beginning of the DCM. In the implementation in FIG. 7, the onset of the DCM is sensed by detecting the time instant $t=T_{41}$ in FIG. 6 when switch voltage $v_{SW}$ falls below energy-storage-capacitor voltage $V_B$. As can be seen from switch-voltage waveform $v_{SW}$ in FIG. 6, to achieve the minimum turn-on loss in this implementation, the delay of the controller needs to be one half of that in FIG. 4, which is given in Eq. (12).

Figure 8:
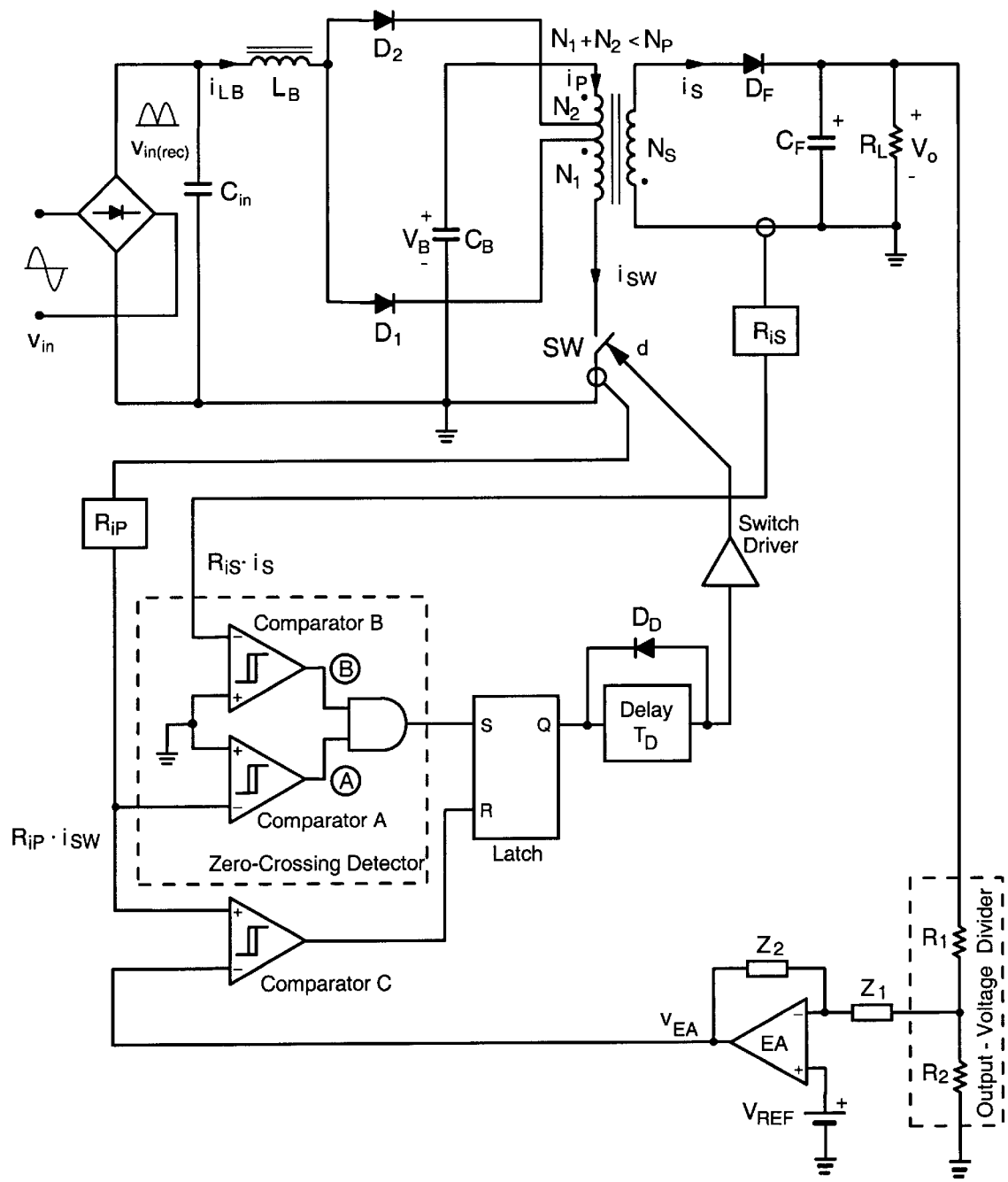
FIG. 8 shows yet another implementation of the S⁴ICS flyback converter in FIG. 4 with a two-tap transformer.

Yet another implementation of the invention is shown in FIG. 8. In this implementation, the flyback transformer with two taps is employed instead of the transformer with a single tap as in FIG. 4. By having two taps, the numbers of turns of windings $N_1$ and $N_2$ in the circuit in FIG. 8 can be independently selected subject only to the constraint $N_1 + N_2 < N_P$. In the circuit in FIG. 4, only the turns ratio can be selected since in this circuit, $N_1 + N_2 = N_P$. With the additional design freedom, the circuit in FIG. 8 can be optimized for a wide range of applications.

Figure 9:
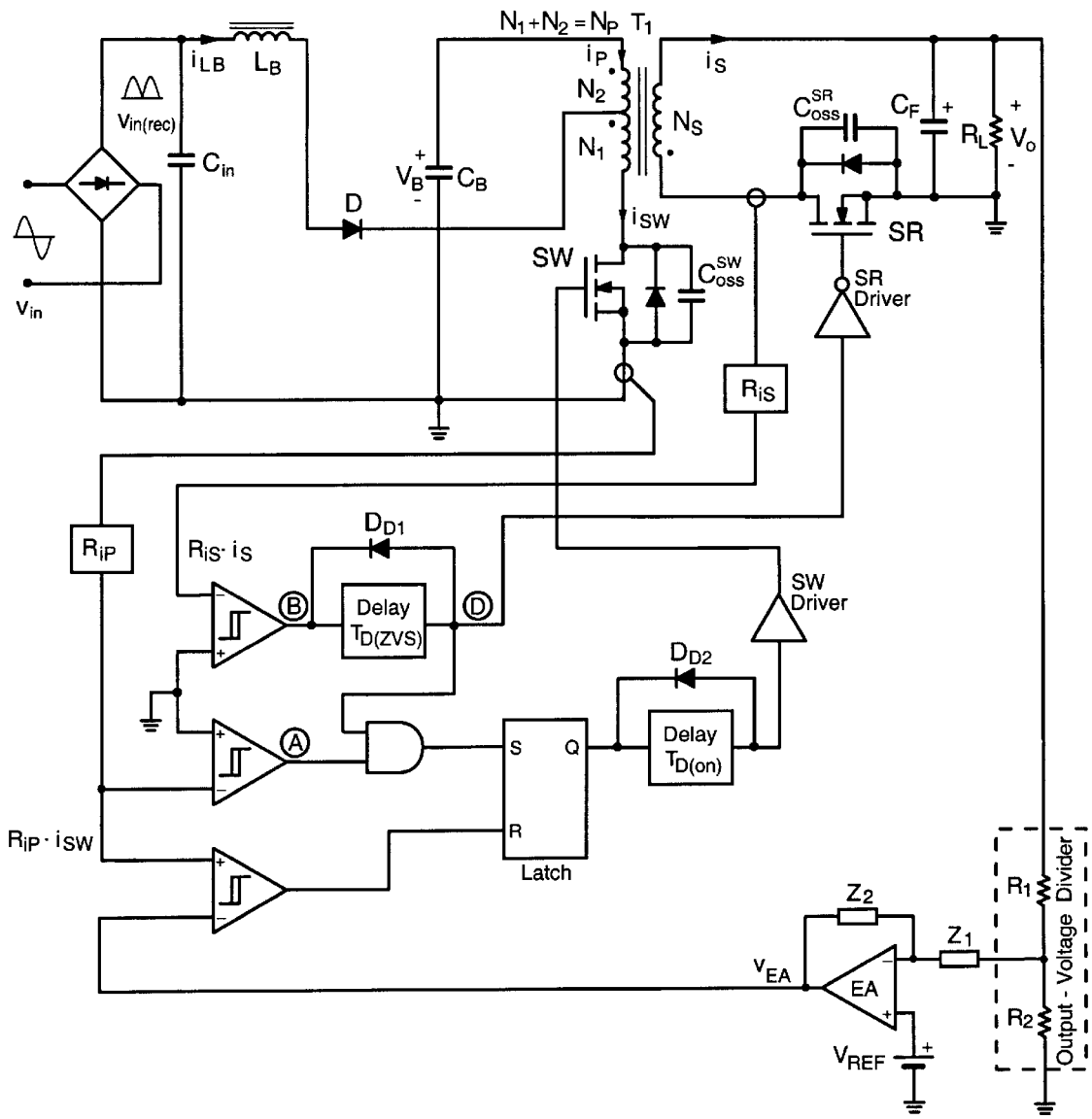
FIG. 9 shows the implementation of the S⁴ICS flyback converter in FIG. 4 with synchronous rectifier.
Figure 10:
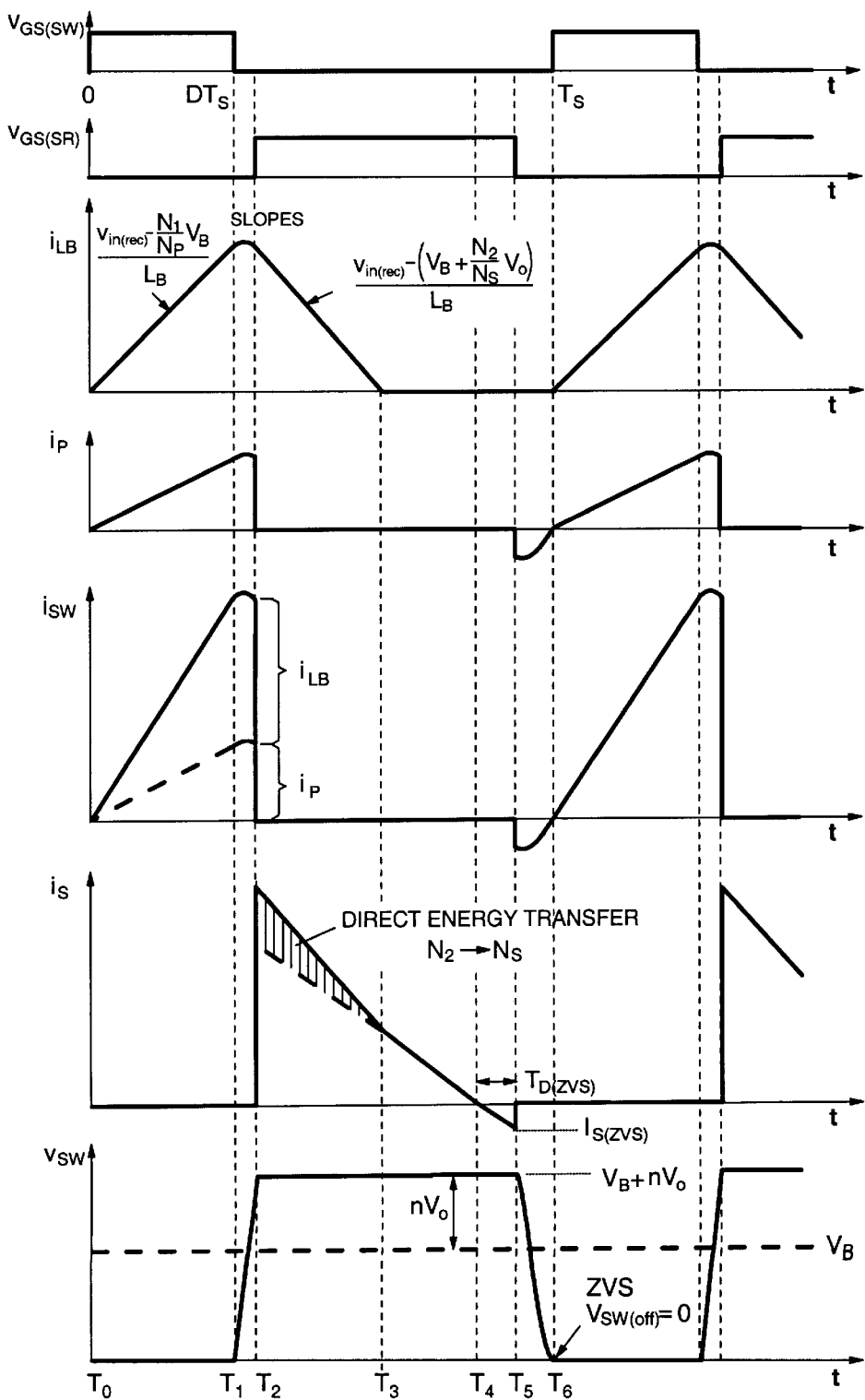
FIG. 10 shows the key waveforms of the S⁴ICS flyback converter with synchronous rectifier in FIG. 9.
Figure 10:
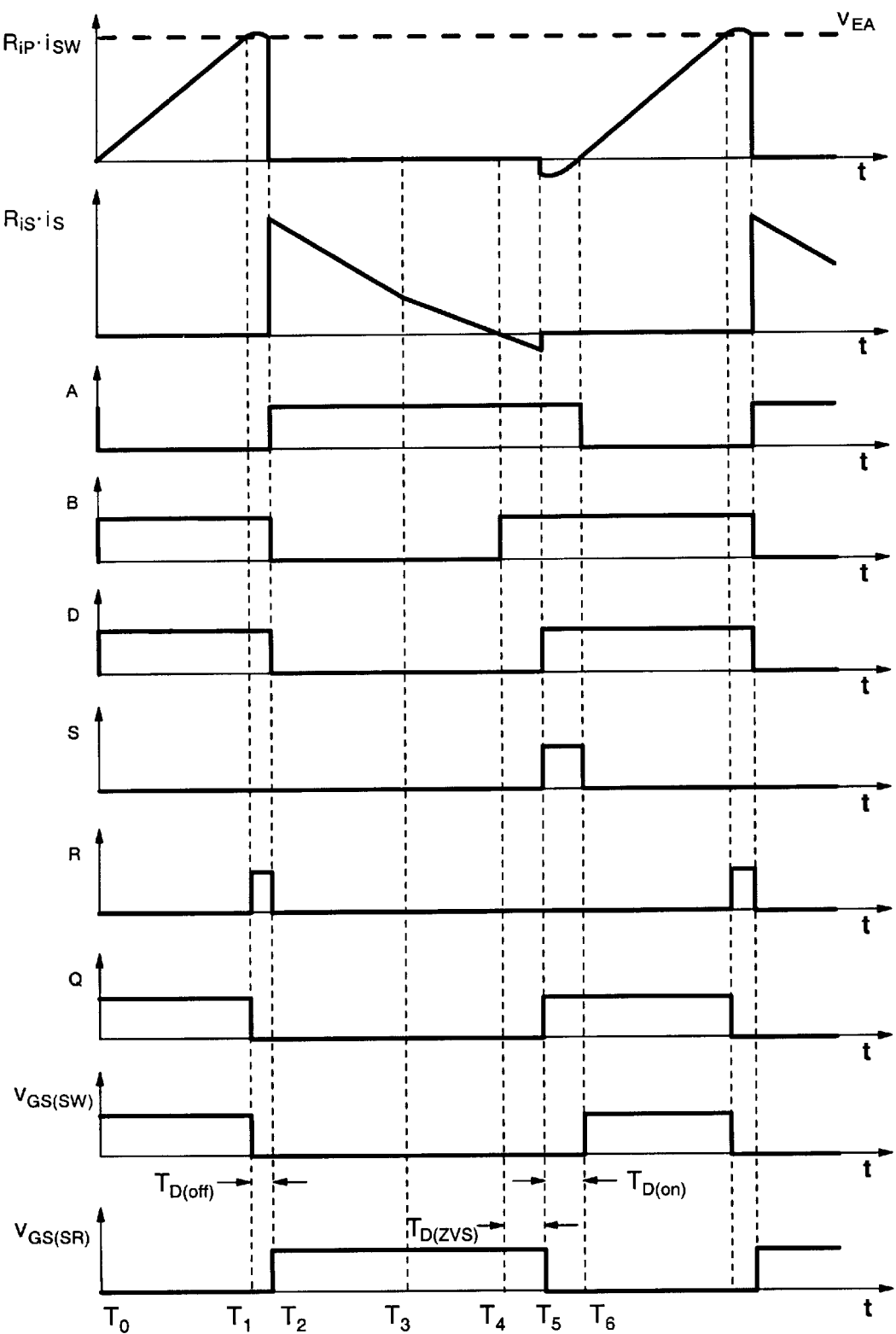

In some applications, the conversion efficiency of the flyback $S^4$ICS can be improved by replacing secondary-side rectifier $D_F$ in FIG. 4 by a synchronous rectifier (i.e., very low on-resistance MOSFET), as shown in FIG. 9. FIG. 10 shows key waveforms of the flyback $S^4$ICS in FIG. 9. For the proper operation of the converter, conduction periods of primary-side switch SW and secondary-side synchronous-rectifier switch SR must not overlap. To avoid the simultaneous conduction of the switches, a delay between the turn-off instant of switch SW and the turn-on instant of switch SR ($T_{D(off)}$ in FIG. 10), as well as between the turn-on instant of switch SW and the turn-off instant of switch SR ($T_{D(on)}$ in FIG. 10) must be introduced in the gate-drive signals of the switches. In the controller in FIG. 9, the $T_{D(on)}$ is implemented by delay-circuit block $T_{D(on)}$. Due to diode $D_{D2}$ connected across the delay circuit, the circuit only delays low-to-high transitions of output Q of the latch. High-to-low transitions of the latch output are unaffected by the delay circuit. Since delay $T_{D(off)}$ occurs naturally in the circuit in FIG. 9 because of the finite commutation time of the transformer currents, no delay circuit is necessary. With properly designed gate drives, the operation of the circuit in FIG. 9 is identical to that of the conventional diode rectifier in FIG. 4.

The circuit in FIG. 9 can be designed to operate with ZVS of switch SW in the entire line range without an increased voltage stress on the switch. To achieve ZVS in the entire line range, the turn-off instant of switch SR should be delayed with respect to the instant the secondary current becomes zero, as shown in FIG. 10. In fact, by delaying the turn-off of switch SR, a negative current (flowing through the channel of switch SR) is allowed to build in the secondary, as can be seen from the $i_S$ waveform in FIG. 10. To achieve ZVS in the entire input-voltage range, the energy stored in magnetizing inductance $L_M$ by the negative secondary current must be large enough to discharge primary-switch capacitance $C_{oss}$ from $V_{SW(max)}=V_{B(max)}+nV_o$ down to zero. As shown in M. T. Zhang, M. M. Jovanovic, and F. C. Lee, "Design Considerations and Performance Evaluations of Synchronous Rectification in Flyback Converters," *IEEE Applied Power Electronics Conference (APEC) Proc.*, pp. 623–630, February 1997, the minimum negative secondary current required for ZVS, $I_{S(ZVS)}$, is given by $$I_{S(ZVS)} = \frac{n\sqrt{V_{B(max)}^2 - (nV_o)^2}}{Z_N}, \qquad (17)$$

whereas, the required delay time, $T_{D(ZVS)}$, is $$T_{D(ZVS)} = \frac{L_M}{n^2 V_o I_{S(ZVS)}}. \qquad (18)$$

In the controller in FIG. 9, the $T_{D(ZVS)}$ is implemented by delay-circuit block $T_{D(ZVS)}$. This delay circuit only affects the low-to-high transition at its input.

To verify the operation and performance of the new S⁴ICS technique, a 65-W/19-V, universal line voltage (90–265 Vac), flyback converter S⁴ICS shown in FIG. 7 was built. The following components were used for the implementation of the circuit: $C_{in}$-0.22 μF, $L_B$-180 μH, D-BYM26C, $C_B$-220 μF/400 V, $T_1$-EER28L core with $N_P$=66 turns, $N_S$=11 turns, $N_1$=$N_2$=33 turns $L_M$=480 μH SW-IRFPC50, $D_F$-16CTQ100, $C_F$-2200 μF. The control circuit was implemented around the integrated circuit MC34262. Table 1 summarizes the measured full-load power factor (PF), total harmonic distortion (THD), bulk-capacitor voltage ($V_B$), efficiency (including inrush-current limiter and EMI filter), and switching-frequency range during a half line cycle. The line current waveform meets the IEC 1000-3-2 standards with a margin larger than 15%.

TABLE 1

MEASURED PERFORMANCE OF EXPERIMENTAL S⁴ICS
($V_o$ = 19 V, $I_o$ = 3.42 A)

| $V_{in}$ [V] | PF | THD [%] | $V_B$ [V] | η [%] | $f_S$ [kHz] |
|---|---|---|---|---|---|
| 90 | 0.899 | 47.5 | 118 | 82.6 | 42–74 |
| 100 | 0.890 | 47.7 | 132 | 83.5 | 50–80 |
| 120 | 0.892 | 49.9 | 160 | 84.6 | 59–93 |
| 230 | 0.897 | 48.8 | 320 | 85.0 | 90–135 |
| 265 | 0.891 | 50.2 | 373 | 84.3 | 96–140 |

While the invention has been described in terms of a single preferred embodiment, those skilled in the art will recognize that the invention can be practiced with modification within the spirit and scope of the appended claims.

We claim:

1. A single-stage single-switch flyback converter with input current shaping and output voltage regulation, comprising in combination:

rectified ac voltage means;

an energy-storage inductor having a first terminal and a second terminal, said first terminal connected to said rectified ac voltage means;

an energy-storage capacitor;

a switch which is periodically closed and opened;

an isolation transformer having a primary winding and a secondary winding, said primary winding connected in series with said switch across said energy-storage capacitor;

a first rectifier means having a first terminal and a second terminal, said first terminal connected to said second terminal of said energy-storage inductor and said second terminal connected to the primary winding of said isolation transformer;

an output-filter capacitor;

a load connected across the output-filter capacitor;

a second rectifier means connecting said secondary winding of said isolation transformer to said output-filter capacitor;

control means for periodically closing said switch to couple said primary winding to said energy storage capacitor, wherein said control means includes a first sensing means to detect the onset of the discontinuous-current mode operation of said isolation transformer and a delay means for closing said switch at a predetermined instant after said first sensing means detects the onset of the discontinuous current mode operation of said isolation transformer in order to turn-on said switch when the voltage across said switch is substantially at a minimum value;

said control means for periodically opening said switch to decouple said primary winding from said energy storage capacitor including a second sensing means to sense the current across said switch to turn off said switch when the current across said switch reaches a predetermined level.

2. A single-stage single-switch flyback converter with input current-shaping and output voltage regulation as in claim 1, wherein said first sensing means of said control means includes a zero-crossing detector for detecting the zero-crossing of the current in said secondary winding of said isolation transformer.

3. A single-stage single-switch flyback converter with input current shaping and output voltage regulation as in claim 1, wherein said first sensing means of said control means includes a voltage detector for detecting the instant when the voltage across said switch equals to the voltage across said energy-storage capacitor.

4. A single-stage single-switch flyback converter with input current shaping and output voltage regulation, comprising in combination:

rectified ac voltage means;

an energy-storage inductor having a first terminal and a second terminal, said first terminal connected to said rectified ac mains;

a first rectifier means having a first terminal and a second terminal, said first terminal connected to said second terminal of said energy-storage inductor; an energy-storage capacitor;

a switch which is periodically closed and open;

an isolation transformer having a primary winding with a tap and a secondary winding, said primary winding connected in series with said switch across said energy-storage capacitor, and said tap of said primary winding connected to said second terminal of said first rectifier means;

an output-filter capacitor;

a load connected across output-filter capacitor;

a second rectifier means connecting said secondary winding of said isolation transformer to said output-filter capacitor;

control means for periodically closing said switch to couple said primary winding to said energy storage capacitor wherein said control means includes a first sensing means to detect the onset of the discontinuous-current mode operation of said isolation transformer and a delay means for closing said switch at a predetermined instant after said first sensing means detects the onset of the discontinuous current mode operation of said isolation transformer in order to turn-on said switch when the voltage across said switch is substantially at a minimum value;

said control means for periodically opening said switch to decouple said primary winding from said energy storage capacitor, includes a second sensing means to sense the current across said switch to turn off said switch when the current across said switch reaches a predetermined level.

5. A single-stage single-switch flyback converter with input current shaping and output voltage regulation, comprising in combination:

rectified ac voltage means;

an energy-storage inductor having a first terminal and a second terminal, said first terminal connected to said rectified ac voltage means;

a first rectifier means having a first terminal and a second terminal, said first terminal connected to said second terminal of said energy-storage inductor;

a second rectifier means having a first terminal and a second terminal, said first terminal connected to said second terminal of said energy-storage inductor;

an energy-storage capacitor;

a switch which is periodically closed and open;

an isolation transformer having a primary winding with a first tap and a second tap and a secondary winding, said primary winding connected in series with said switch across said energy-storage capacitor, said first tap of said primary winding connected to said second terminal of said first rectifier means and said second tap of said primary winding connected to said second terminal of said second rectifier means;

an output-filter capacitor;

a load connected across output-filter capacitor;

a third rectifier means connecting said secondary winding of said isolation transformer to said output filter capacitor;

control means for periodically closing said switch to couple said primary winding to said energy storage capacitor, wherein said control means includes a first sensing means to detect the onset of the discontinuous-current mode operation of said isolation transformer and a delay means for closing said switch at a predetermined instant after said first sensing means detects the onset of the discontinuous current mode operation of said isolation transformer in order to turn-on said switch when the voltage across said switch is substantially at a minimum value;

said control means for periodically opening said switch to decouple said primary winding from said energy storage capacitor also includes a second sensing means to sense the current across said switch to turn off said switch when the current across said switch reaches a determined level.

6. A single-stage single-switch flyback converter with input current shaping and output voltage regulation as in claim 5, wherein said first sensing means of said control means includes a zero-crossing detector for detecting the zero-crossing of the current in said secondary winding of said isolation transformer.

7. A single-stage single-switch flyback converter with input current shaping and output voltage regulation as in claim 5, wherein said first sensing means of said control means includes a voltage detector for detecting the instant when the voltage across said switch equals to the voltage across said energy-storage capacitor.

8. A single-stage single-switch flyback converter with input current shaping and output voltage regulation, comprising in combination:

rectified ac voltage means;

an energy-storage inductor having a first terminal and a second terminal, said first terminal connected to said rectified ac voltage means:

an energy-storage capacitor;

a switch which is periodically closed and open;

an isolation transformer having a primary and a secondary winding, said primary winding connected in series with said switch across said energy-storage capacitor;

means connecting said second terminal of said energy-storage inductor to said primary winding of said isolation transformer;

an output-filter capacitor;

a load connected across output-filter capacitor;

a synchronous rectifier connecting said secondary winding of said isolation transformer to said output filter capacitor;

control means for periodically closing said switch and said synchronous rectifier in mutually exclusive time intervals, wherein said control means includes a zero-current detector for detecting the zero-crossing of the current in said secondary winding of said isolation transformer and a first delay means and a second delay means, said first delay means used to define the instant at which said synchronous rectifier is opened after said zero-crossing detector detects the zero crossing of the current in said secondary winding of said isolation transformer, and said second delay means used to define the instant at which said switch is closed after said synchronous rectifier is opened in order to turn-on said switch when the voltage across said switch is zero or close to zero, and, wherein, said control means includes a sensing means to sense the current across said switch to turn off said switch and to turn-on said synchronous rectifier when the current across said switch reaches a predetermined level.

9. A single-stage single-switch flyback converter with input current shaping and output voltage regulation, comprising in combination:

rectified ac voltage means;

an energy-storage inductor having a first terminal and a second terminal, said first terminal connected to said rectified ac voltage means:

a rectifier means having a first terminal and a second terminal, said first terminal connected to said second terminal of said energy-storage inductor;

an energy-storage capacitor;

a switch which is periodically closed and open;

an isolation transformer having a primary winding with a tap and a secondary winding, said primary winding connected in series with said switch across said energy-storage capacitor, and said tap of said primary winding connected to said second terminal of said first rectifier means;

an output-filter capacitor;

a load connected across output-filter capacitor;

a synchronous rectifier connecting said secondary winding of said isolation transformer to said output filter capacitor;

control means for periodically closing said switch and said synchronous rectifier in mutually exclusive time intervals, wherein said control means includes a zero-current detector for detecting the zero-crossing of the current in said secondary winding of said isolation transformer and a first delay means and a second delay means, said first delay means used to define the instant at which said synchronous rectifier is opened after said zero-crossing detector detects the zero crossing of the current in said secondary winding of said isolation transformer, and said second delay means used to define the instant at which said switch is closed after said synchronous rectifier is opened in order to turn-on said switch when the voltage across said switch is zero or close to zero, and, wherein, said control means includes a sensing means to sense the current across said switch to turn off said switch and to turn-on said synchronous rectifier when the current across said switch reaches a predetermined level.

10. A single-stage single-switch flyback converter with input current shaping and output voltage regulation, comprising in combination:

rectified ac voltage means;

an energy-storage inductor having a first terminal and a second terminal, said first terminal connected to said rectified ac voltage means;

a first rectifier means having a first terminal and a second terminal, said first terminal connected to said second terminal of said energy-storage inductor;

a second rectifier means having a first terminal and a second terminal, said first terminal connected to said second terminal of said energy-storage inductor;

an energy-storage capacitor;

a switch which is periodically closed and open;

an isolation transformer having a primary winding with a first tap and a second tap and a secondary winding, said primary winding connected in series with said switch across said energy-storage capacitor, said first tap of said primary winding connected to said second terminal of said first rectifier means and said second tap of said primary winding connected to said second terminal of said second rectifier means;

an output-filter capacitor;

a load connected across output-filter capacitor;

a synchronous rectifier connecting said secondary winding of said isolation transformer to said output filter capacitor;

control means for periodically closing said switch and said synchronous rectifier in mutually exclusive time intervals, wherein said control means includes a zero-current detector for detecting the zero-crossing of the current in said secondary winding of said isolation transformer and a first delay means and a second delay means, said first delay means used to define the instant at which said synchronous rectifier is opened after said zero-crossing detector detects the zero crossing of the current in said secondary winding of said isolation transformer, and said second delay means used to define the instant at which said switch is closed after said synchronous rectifier is opened in order to turn-on said switch when the voltage across said switch is zero or close to zero, and, wherein, said control means includes a sensing means to sense the current across said switch to turn off said switch and to turn-on said synchronous rectifier when the current across said switch reaches a determined level.

* * * * *